United States Patent
Agusa et al.

(10) Patent No.: US 7,545,445 B2
(45) Date of Patent: Jun. 9, 2009

(54) BROADCAST CHANNEL CHANGE DETECTION APPARATUS PROVIDED WITH DETECTION DEVICE FOR DETECTING CHANGE OF CHANNEL OF THE BROADCAST WAVE

(75) Inventors: Reiji Agusa, Hyogo (JP); Yasushi Yoneda, Osaka (JP); Kinya Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 405 days.

(21) Appl. No.: 10/565,825

(22) PCT Filed: Jul. 23, 2004

(86) PCT No.: PCT/JP2004/010878

§ 371 (c)(1),
(2), (4) Date: Jun. 8, 2006

(87) PCT Pub. No.: WO2005/011265

PCT Pub. Date: Feb. 3, 2005

(65) Prior Publication Data
US 2006/0245446 A1 Nov. 2, 2006

(30) Foreign Application Priority Data
Jul. 25, 2003 (JP) .............................. 2003-279810

(51) Int. Cl.
*H04N 5/50* (2006.01)
(52) U.S. Cl. ....................................... 348/732; 348/731
(58) Field of Classification Search ......... 348/731–733, 348/725, 570; 725/38, 35, 50
See application file for complete search history.

(56) References Cited

U.S. PATENT DOCUMENTS 6,601,237 B1  7/2003  Ten Kate et al.

(Continued)

FOREIGN PATENT DOCUMENTS

EP   0 808 020   11/1997

(Continued)

OTHER PUBLICATIONS

Supplementary European Search Report issued May 6, 2008 in Application No. EP 04 74 8086.

(Continued)

*Primary Examiner*—M. Lee
(74) *Attorney, Agent, or Firm*—Wenderoth, Lind & Ponack, L.L.P.

(57) ABSTRACT

A broadcast channel change detection apparatus receives a broadcast wave including channel change information that includes a change date and time of a physical channel of the broadcast wave and physical channels before and after the change, and searches and detects channel change plan information including the change date and time regarding the physical channel to be changed in a television receiver apparatus and the physical channels before and after the change, based on the channel change information. Next, the broadcast channel change detection apparatus receives the broadcast wave on the physical channel after the change in the channel change plan information, and judges whether or not the broadcast wave is actually receivable based on the detected channel change plan information, when the change date and time in the channel change plan information is older than or equal to a current date and time.

8 Claims, 8 Drawing Sheets

U.S. PATENT DOCUMENTS

| | | | |
|---|---|---|---|
| 6,621,528 B1 * | 9/2003 | Kessler et al. | 348/734 |
| 7,227,583 B2 * | 6/2007 | Sin | 348/570 |
| 2002/0101540 A1 | 8/2002 | Takagi et al. | |
| 2002/0116709 A1 | 8/2002 | Sakamoto et al. | |

FOREIGN PATENT DOCUMENTS

| | | |
|---|---|---|
| JP | 9-307406 | 11/1997 |
| JP | 2001-36888 | 2/2001 |
| JP | 2002-101352 | 4/2002 |
| JP | 2002-152649 | 5/2002 |
| JP | 2002-354369 | 12/2002 |
| WO | 00/40012 | 7/2000 |

OTHER PUBLICATIONS

English translation of the International Preliminary Report on Patentability issued May 15, 2006 in PCT/JP2004/010878.

* cited by examiner

Fig.2

CHANNEL PRESET INFORMATION TABLE 31

| KEY NUMBER | DISPLAY CHANNEL | PHYSICAL CHANNEL |
|---|---|---|
| 1 | 19 | 19 |
| 2 | 2 | 34 |
| 3 | 36 | 36 |
| ⋮ | ⋮ | ⋮ |
| 16 | BS7 | BS7 |

Fig.3

CHANNEL CHANGE PLAN INFORMATION TABLE 32

| ADDRESS | CHANGE DATE AND TIME | PHYSICAL CHANNEL BEFORE CHANGE | PHYSICAL CHANNEL AFTER CHANGE |
|---|---|---|---|
| 1 | ELAPSED | 34 | 54 |
| 2 | 2004.08.01;03:00 | 38 | 56 |
| 3 | 2004.08.15;04:00 | 40 | 58 |
| ⋮ | ⋮ | ⋮ | ⋮ |

Fig.4

CHANNEL SHIFT LIST TABLE 35

| ADDRESS | PHYSICAL CHANNEL BEFORE CHANGE | PHYSICAL CHANNEL AFTER CHANGE |
|---|---|---|
| 1 | 34 | 54 |
| 2 | 38 | 56 |
| ------ | ------ | ------ |

Fig.5

RECORCING RESERVATION TABLE 36

| RESERVATION NUMBER | START DATE AND TIME | END DATE AND TIME | KEY NUMBER |
|---|---|---|---|
| 1 | 2004.7.20;20:00 | 2004.7.20;20:56 | 2 |
| 2 | 2004.7.21;21:00 | 2004.7.21;21:45 | 6 |
| 3 | 2004.7.23;23:30 | 2004.7.23;23:55 | 10 |
| ------ | ------ | ------ | ------ |

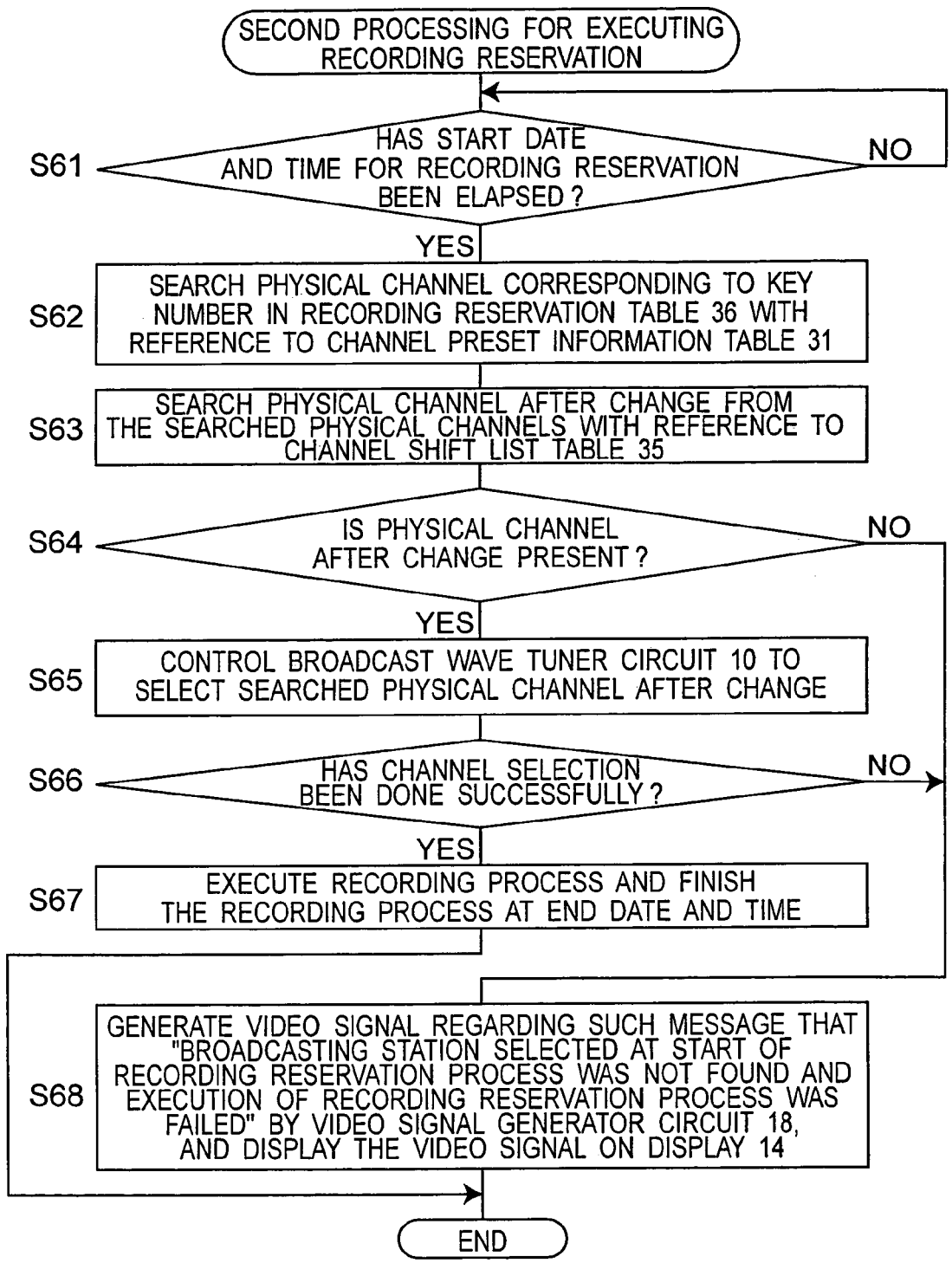

BROADCAST CHANNEL CHANGE DETECTION APPARATUS PROVIDED WITH DETECTION DEVICE FOR DETECTING CHANGE OF CHANNEL OF THE BROADCAST WAVE

TECHNICAL FIELD

The present invention relates to a broadcast channel change detection apparatus for detecting and confirming a change of a broadcast channel of a broadcast wave, and relates to a recording apparatus and a television receiver apparatus using the broadcast channel change detection apparatus.

BACKGROUND ART

In recent years, for example, with starting broadcasting of a terrestrial digital broadcasting station, existing broadcast channels are changed, and new broadcast channels are added so as to prevent overlapping of the new broadcast channels on the existing broadcast channels due to addition of the new broadcast channels. In this case, a user reexecutes a so-called "channel search" after the broadcast channels are changed. Then, all broadcast channels are swept, and a broadcast wave signal having an electric field intensity equal to or higher than a predetermined threshold value is detected, and then, a broadcast channel of the detected broadcast wave signal is set to "preset information".

As an apparatus including a function of automatically acquiring channel selection data according to a prior art, an automatic channel selection apparatus including (a) a memory for storing channel selection data, and (b) an automatic channel selection control section for sequentially executing a preset channel selection by allowing a tuner control section to automatically perform a channel selection operation and storing the channel selection data in the memory, is disclosed in, for example, the Japanese Patent Application Laid-Open No. 9-307406. First of all, the automatic channel selection apparatus judges whether or not the memory is in an initial state. When it is judged that the memory is in the initial state, the automatic channel selection apparatus issues an instruction to the automatic channel selection control section so as to automatically select a channel. Then, the automatic channel selection apparatus starts an automatic channel selection operation to preset the channel selection data in the memory. By employing the automatic channel selection apparatus of the prior art, the channel selection data can be represet without any user's execution of preset instruction operation.

DISCLOSURE OF THE INVENTION

However, in the above-stated prior art, although the "channel search" is automatically executed only when the memory is completely in the initial state or contents of the memory are lost, the apparatus of the prior art is incapable of dealing with a case in which a broadcast channel is changed while the presetting has been already completed. Namely, the user cannot recognize that the broadcast channel is changed until the "channel search" is executed, and can not instantly recognize that there is a change of the broadcast channel. As a result, it is disadvantageously inconvenient for the user.

In addition, a broadcasting station sometimes transmits "channel change plan information" in advance over a broadcast wave, which includes planned date and time information for changing the broadcast channel, and channel information before and after the change. However, an error on the date and time may generate depending on the broadcasting station. It is sometimes impossible to follow an actual change of the broadcast channel only based on the "channel change plan information" received in advance. Therefore, the above-stated prior art has such a problem that the broadcast wave often cannot be actually receivable depending on the broadcast channel.

Further, if the "preset information" is updated without notifying the user of the update, the broadcast wave on a broadcast channel, which is different from the broadcast channel, and on which the broadcast wave is received by an operational method of the prior art, is received when the broadcast wave is received using the "preset information". As a result, even if the broadcast channel is changed, the user does not know on which broadcast channel the broadcast wave is received, and this leads to confusion for the user.

It is a first object of the present invention to provide a broadcast channel change detection apparatus, that can solve the above-stated problems, detect a broadcast channel change without any user's execution of a "channel search", and that can prevent a non-receivable state resulting from an error between a channel change date and time planned by a broadcasting station and an actual channel change date and time, from being reflected in the "preset information".

In addition, it is a second object of the present invention to provide a broadcast channel change detection apparatus, that can confirm whether or not a broadcast wave on the broadcast channel is actually receivable when the broadcast channel change is detected.

Further, it is a third object of the present invention to provide a broadcast channel change detection apparatus, that can notify a user of such a message, that the broadcast channel change is detected or reception of the broadcast wave on the broadcast channel is confirmed, when the broadcast channel change is detected or reception of the broadcast wave on the broadcast channel is confirmed.

Still further, it is a fourth object of the present invention to provide a broadcast channel change detection apparatus that can automatically update the "preset information" when the broadcast channel change is detected, or the reception of the broadcast wave on the broadcast channel is confirmed.

Still further, it is a fifth object of the present invention to provide a recording apparatus and a television receiver apparatus, each of which includes the above-mentioned broadcast channel change detection apparatus.

According to the first aspect of the present invention, there is provided a broadcast channel change detection apparatus comprising a detection device. The detection device receives a broadcast wave including channel change information that includes a change date and time of a physical channel of the broadcast wave and physical channels before and after the change, and searches and detects channel change plan information that includes the change date and time regarding the physical channel to be changed in a television receiver apparatus and the physical channels before and after the change, based on the channel change information.

According to the second aspect of the present invention, there is provided a broadcast channel change detection apparatus comprising: a first storage device and a detection device. The first storage device previously stores channel preset information including a physical channel of a broadcast wave received by a television receiver apparatus. The detection device receives the broadcast wave including channel change information that includes a change date and time of the physical channel of the broadcast wave and physical channels before and after the change, and searches and detects channel change plan information that includes the change date and time regarding the physical channel to be changed in said television receiver apparatus and the physical channels before and after the change, based on the channel preset information and the channel change information.

In the above-mentioned broadcast channel change detection apparatus, the broadcast channel change detection apparatus further includes a judgment device. The judgment device receives the broadcast wave on the physical channel after the change in the channel change plan information, and judges whether or not the broadcast wave is actually receivable based on the detected channel change plan information, when the change date and time in the channel change plan information is older than or equal to a current date and time. In this case, the judgment device stores the physical channels before and after the change regarding the broadcast wave that is actually receivable, in a second storage device as a channel shift list.

In addition, in the above-mentioned broadcast channel change detection apparatus, the broadcast channel change detection apparatus further includes a notification device. The notification device notifies a user of information of the stored channel shift list. Alternatively, in the above-mentioned broadcast channel change detection apparatus, the broadcast channel change detection apparatus further includes an update device. The update device updates the channel preset information including the physical channel of the broadcast wave received by the television receiver apparatus, based on the information of the stored channel shift list.

Further, in the above-mentioned broadcast channel change detection apparatus, the broadcast channel change detection apparatus further includes a notification device. The notification device notifies a user of the detected channel change plan information. Alternatively, in the above-mentioned broadcast channel change detection apparatus, the broadcast channel change detection apparatus further includes an update device. The update device updates the channel preset information including the physical channel of the broadcast wave received by the television receiver apparatus, based on the detected channel change plan information.

According to the third aspect of the present invention, there is provided a recording apparatus including the above-mentioned broadcast channel change detection apparatus, and a recording device. The recording device receives the broadcast wave, and records video and audio signals of the received broadcast wave.

In the above-mentioned recording apparatus, the recording apparatus further includes a controller. The controller judges whether or not a physical channel after the change is present based on the channel change plan information upon executing a reserved recording process, receives the broadcast wave on the physical channel after the change in the channel change plan information and judging whether or not the broadcast wave is actually receivable when the physical channel after the change is present, and executes the recording process when the broadcast wave is actually receivable. In this case, the controller notifies a user that the recording process failed when the broadcast wave is actually non-receivable.

In the above-mentioned recording apparatus, the recording apparatus further includes a controller. The controller judges whether or not a physical channel after the change is present based on the channel shift list upon executing a reserved recording process, receives the broadcast wave on the physical channel after the change in the channel shift list and judging whether or not the broadcast wave is actually receivable when the physical channel after the change is present, and executes the recording process when the broadcast wave is actually receivable. In this case, the controller notifies a user that the recording process failed when the broadcast wave is actually non-receivable.

According to the fourth aspect of the present invention, there is provided a television receiver apparatus for receiving a broadcast wave, and displaying and outputting video and audio signals of the received broadcast wave, respectively. The television receiver apparatus includes the above-mentioned broadcast channel change detection apparatus.

According to the fifth aspect of the present invention, there is provided a television receiver apparatus for receiving a broadcast wave, and displaying and outputting video and audio signals of the received broadcast wave, respectively. The television receiver apparatus includes the above-mentioned recording apparatus.

Therefore, the broadcast channel change detection apparatus according to the present invention can search and automatically detect the channel change plan information including the change date and time regarding the physical channel to be changed in the television receiver apparatus, and the physical channels before and after the change. Therefore, it is possible to detect that the broadcast channel is changed without any user's execution of the "channel search" or the like, and to prevent a non-receivable state resulting from an error between the change date and time of the channel planned by the broadcasting station and an actual change date and time from being reflected in the "preset information".

In addition, when the change date and time in the channel change plan information is older than or equal to the current date and time, the broadcast channel change detection apparatus receives the broadcast wave on the physical channel after the change in the channel change plan information, and judges whether or not the broadcast wave is actually receivable based on the detected channel change plan information. Then, the broadcast channel change detection apparatus stores the physical channels before and after the change regarding the broadcast wave that is actually receivable in the second storage device as the channel shift list. Therefore, it is possible to confirm whether or not the broadcast wave on the broadcast channel is actually receivable when the broadcast channel change is detected.

Further, when the broadcast channel change is detected or reception of the broadcast wave on the broadcast channel is confirmed, it is possible to notify a user of such a message that the broadcast channel change is detected or reception of the broadcast wave on the broadcast channel is confirmed, or to update the "preset information" appropriately.

BRIEF DESCRIPTION OF THE DRAWINGS

FIG. 2 is a diagram showing one example of a configuration of a channel preset information table 31 in a data memory 30 of FIG. 1.

FIG. 3 is a diagram showing one example of a configuration of a channel change plan information table 32 in the data memory 30 of FIG. 1.

FIG. 4 is a diagram showing one example of a configuration of a channel shift list table 35 in the data memory 30 of FIG. 1.

FIG. 5 is a diagram showing one example of a configuration of a recording reservation table 36 in the data memory 30 of FIG. 1.

FIG. 10 is a flowchart showing a second processing for executing the recording reservation, which is executed by the apparatus controller 20 of FIG. 1.

BEST MODE FOR CARRYING OUT THE INVENTION

Preferred embodiments of the present invention will be described hereinafter with reference to the drawings.

Figure 1:
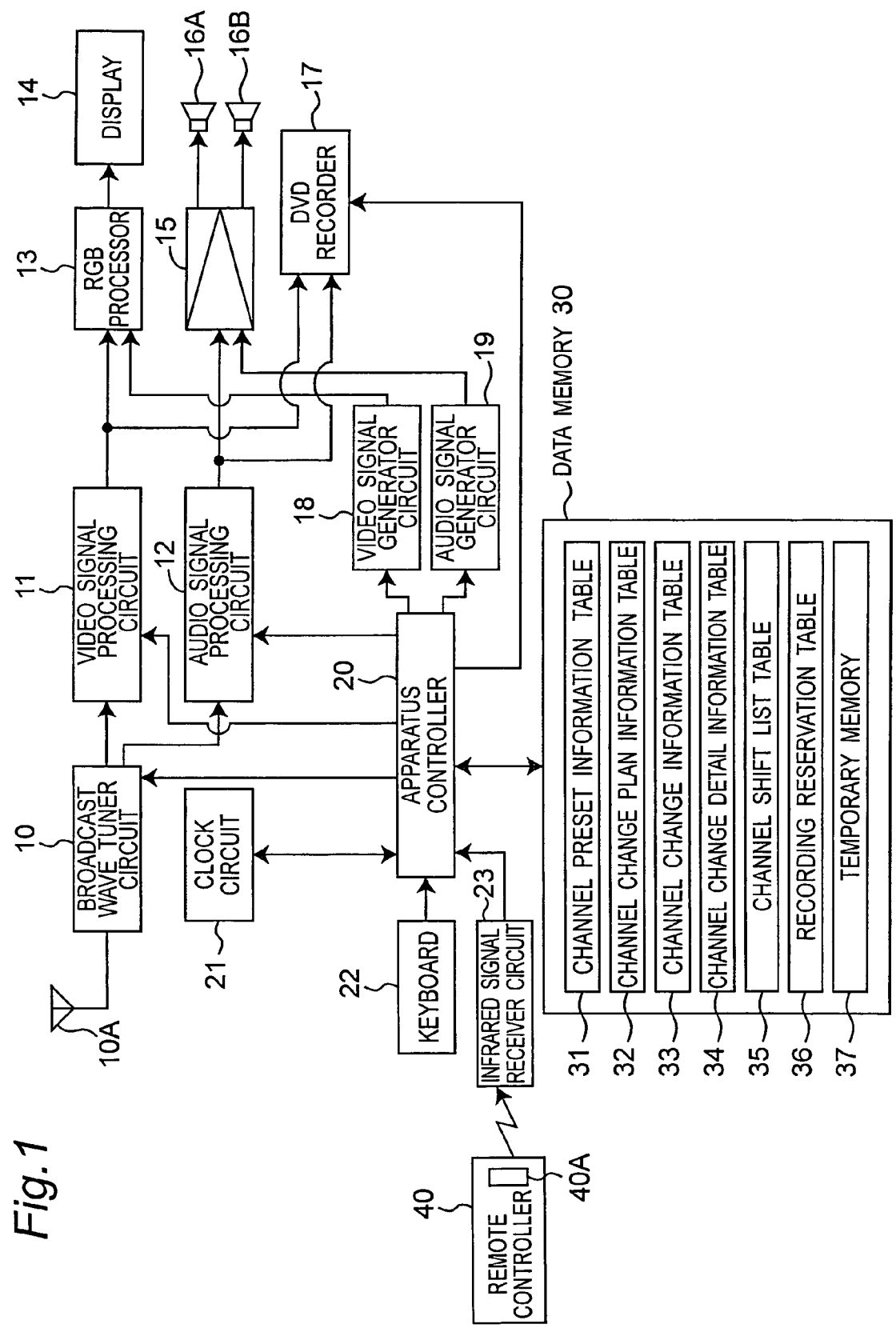
FIG. 1 is a block diagram showing a configuration of a television receiver apparatus that includes a broadcast channel change detection function according to a preferred embodiment of the present invention.
Figure 6:
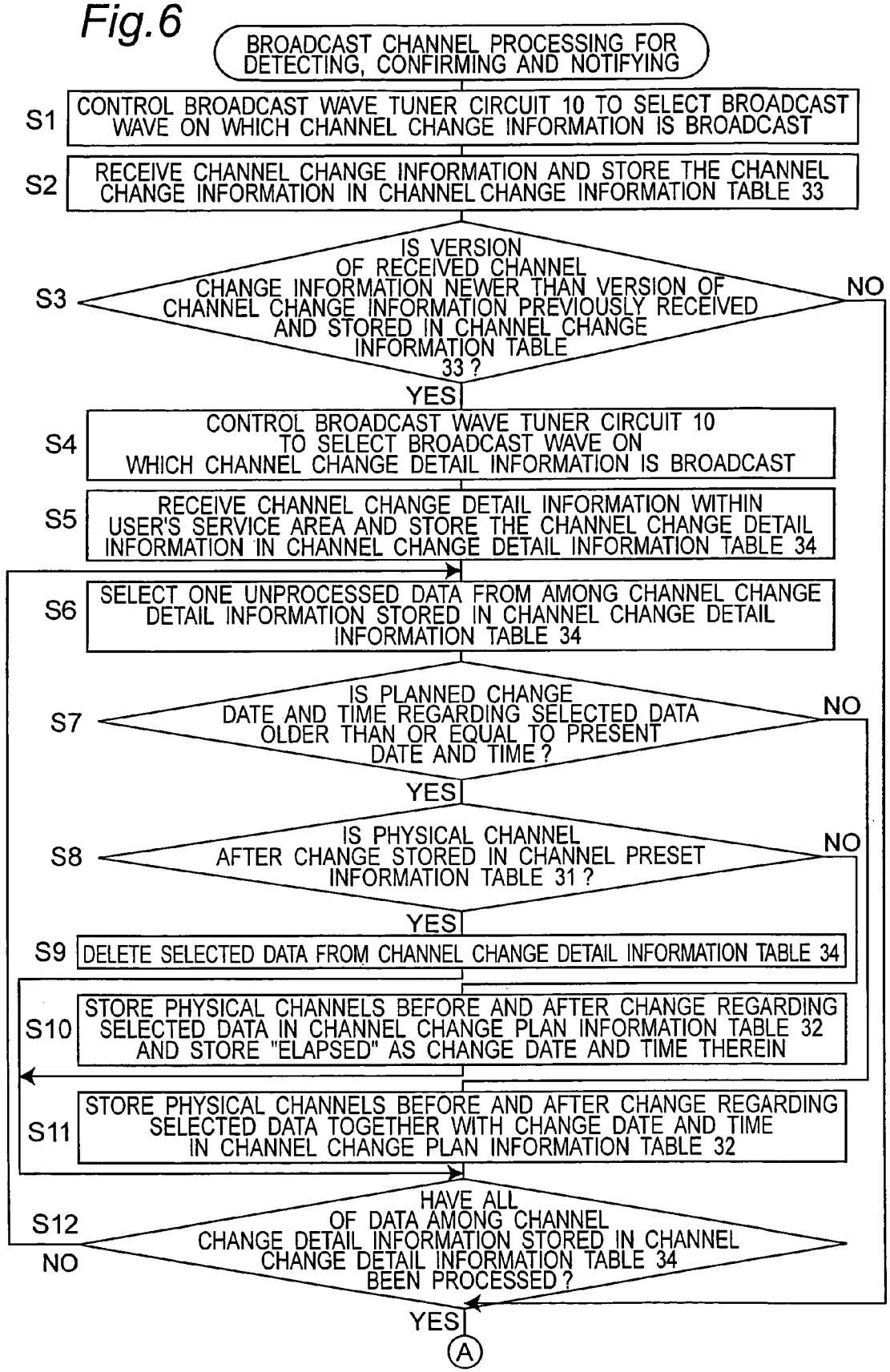
FIG. 6 is a flowchart showing a first part of a processing for detecting, confirming, and notifying a broadcast channel change, which is executed by an apparatus controller 20 of FIG. 1.
Figure 7:
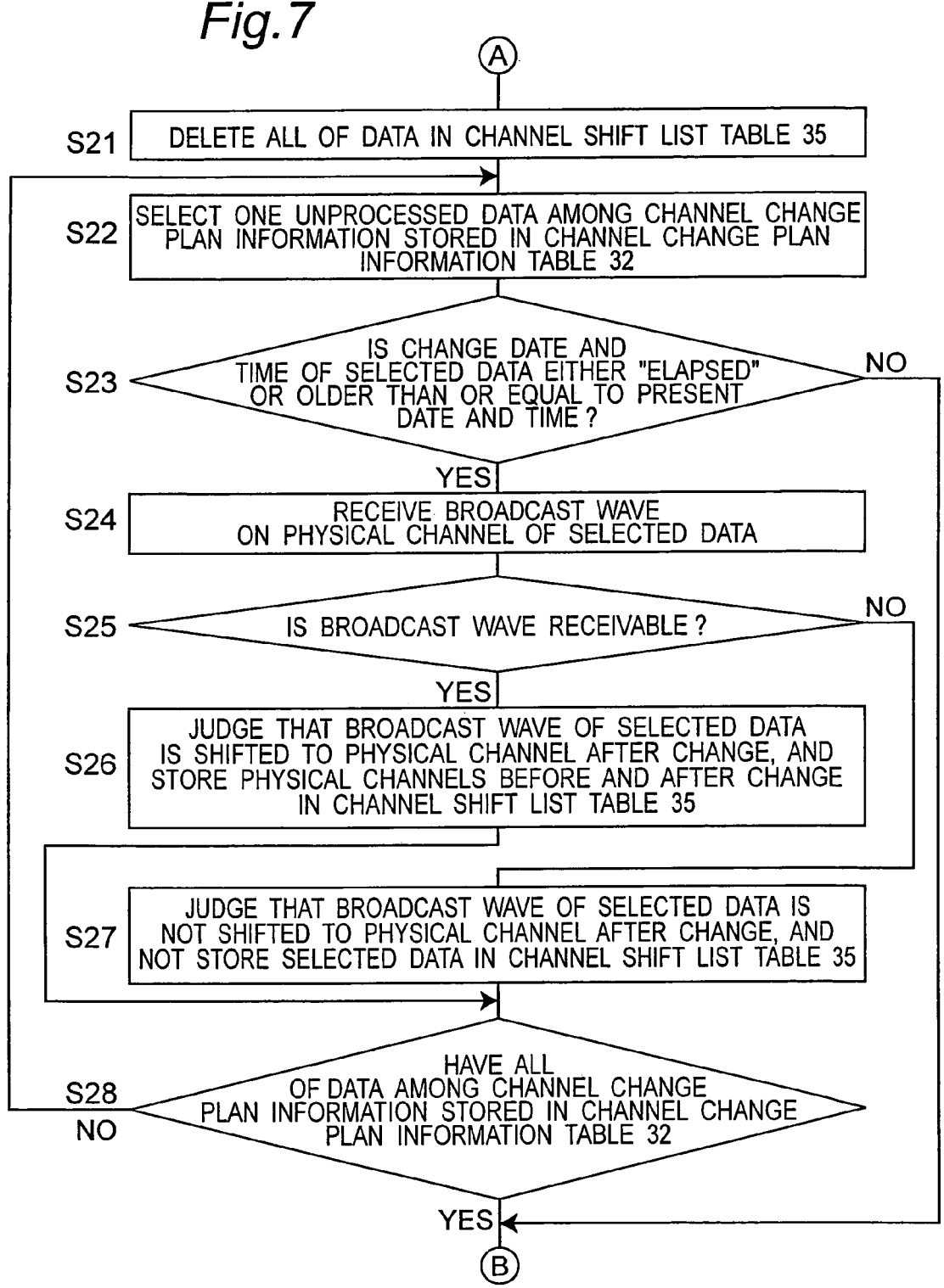
FIG. 7 is a flowchart showing a second part of the processing for detecting, confirming, and notifying the broadcast channel change, which is executed by the apparatus controller 20 of FIG. 1.
Figure 8:
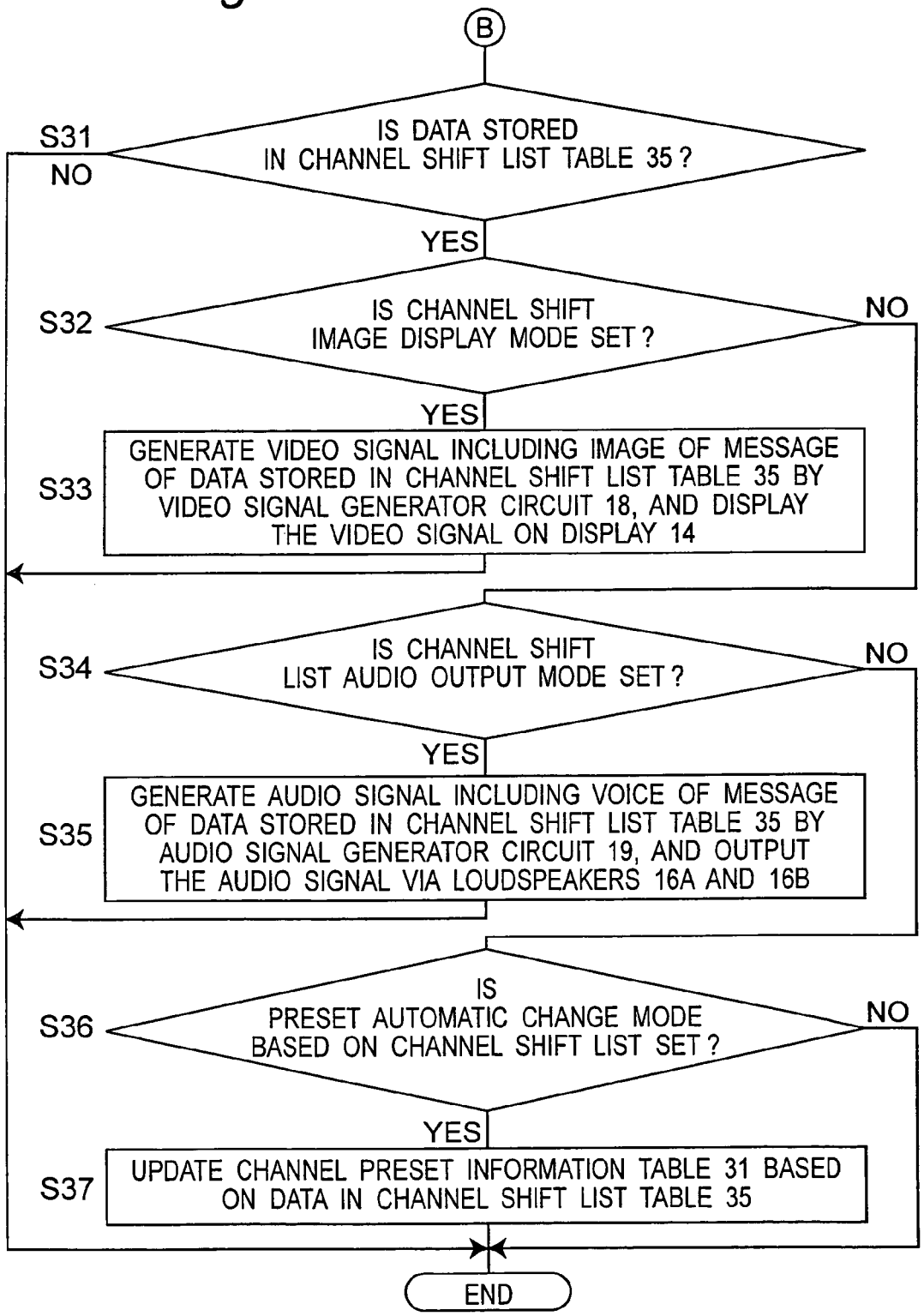
FIG. 8 is a flowchart showing a third part of the processing for detecting, confirming, and notifying the broadcast channel change, which is executed by the apparatus controller 20 of FIG. 1.

FIG. 1 is a block diagram showing a configuration of a television receiver apparatus that includes a broadcast channel change detection function according to a preferred embodiment of the present invention. An apparatus controller 20 of the television receiver apparatus according to a preferred embodiment of the present invention is characterized as follows. The apparatus controller 20 executes a processing for detecting, confirming, and notifying a broadcast channel change, which is shown in FIGS. 6 to 8, to detect a change of a broadcast channel of a broadcast wave, to confirm whether or not the broadcast wave on the broadcast channel is actually receivable, and to notify such a message that the broadcast wave on the broadcast channel is actually receivable, or update preset information in a channel preset information table 31 stored in a data memory 30 based on a confirmation result.

Referring to FIG. 1, a broadcast wave is received by a broadcast wave tuner circuit 10 via an antenna 10A. The broadcast wave tuner circuit 10 executes processings, such as low noise amplification, frequency conversion, intermediate frequency amplification, and demodulation and the like, on a radio signal on the received broadcast wave. The, the broadcast wave tuner circuit 11 extracts from the radio signal into video and audio signals, and outputs the video and audio signals to a video signal processing circuit 11 and an audio signal processing circuit 12, respectively. The video signal processing circuit 11 executes signal processings such as descrambling and decoding on the inputted video signal, and then, outputs the resultant video signal to an RGB processor 13 and a DVD recorder 17. The audio signal processing circuit 12 executes processings such as descrambling and decoding on the inputted audio signal, and then, outputs the resultant audio signal to each of an amplifier 15 and the DVD recorder 17. The RGB processor 13 combines the video signal from the video signal processing circuit 11 with a video signal from a video signal generator circuit 18. Then, the RGB processor 13 converts the combined video signal into an RGB signal, and outputs the RGB signal to a display 14 such as a liquid crystal display to display the RGB signal on the display 14. The amplifier 15 combines audio signals on two channels from the audio signal processing circuit 12, with audio signals on two channels from an audio signal generator circuit 19. Then, the amplifier 15 amplifies powers of the combined audio signals on the two channels, and outputs the audio signals on the two channels to two loudspeakers 16A and 16B, respectively. Further, based on a control signal from the apparatus controller 20, the DVD recorder 17 records the inputted video and audio signals on an optical disk such as a DVD, a CD-RW, or the like. On the other hand, the DVD recorder 17 reproduces the video and audio signals stored in the optical disk.

According to the preferred embodiment of the present invention, the audio signals on the two channels are processed. However, the present invention is not limited to this. An audio signal on one channel, audio signals of 5.1-channel sound, or audio signals on a plurality of channels may be processed.

The apparatus controller 20 controls operation of an entire television receiver including the DVD recorder 17. It is noted that a clock circuit 21, a keyboard 22, an infrared signal receiver circuit 23, and a data memory 30 are connected to the apparatus controller 20. In addition, the clock circuit 21 counts a current date and time, and outputs data on the current date and time to the apparatus controller 20. The clock circuit 21 may correct the counted current date and time based on current date and time information, for example, included in a broadcast wave, or based on current date and time information received via a communication line such as the Internet or the like. Further, the apparatus controller 20 may use the current date and time information, for example, included in the broadcast wave without processing the current date and time information. As described later in detail, the data memory 30 includes various tables 31 to 36 and a temporary memory 37 for temporarily saving and storing various types of data. Data and instruction information inputted by a user with the keyboard 22 are inputted to the apparatus controller 20. An infrared signal, which includes a remote control message, and which is inputted from an infrared transmitter section 40A of a remote controller 40 that remotely controls operation of the television receiver apparatus, is received and decoded by the infrared signal receiver circuit 23. The decoded data is inputted to the apparatus controller 20.

Further, the apparatus controller 20 executes the processing for detecting, confirming, and notifying the broadcast channel change, which is shown in FIGS. 6 to 8, with reference to the various tables and data stored in the data memory 30 to be described later in detail. Therefore, the apparatus controller 20 detects the change of the broadcast channel for the broadcast wave, confirms whether or not the broadcast wave on the broadcast channel is actually receivable, and notifies such a message that the broadcast wave on the broadcast channel is actually receivable, or updates the preset information in the channel preset information table 31 stored in the data memory 30 based on the confirmation result.

When a channel shift list image display mode, for example, is set, the apparatus controller 20 allows the video signal generator circuit 18 to generate a video signal regarding data in the channel shift list table 35 stored in the data memory 30, and displays the generated video signal on the display 14. Further, in a processing for executing a recording reservation shown in FIG. 9 or 10, the apparatus controller 20 allows the video signal generator circuit 18 to generate a video signal regarding such a message that "broadcasting station selected at start of recording reservation process was not found, and execution of recording reservation process was failed", and displays the message on the display 14. When a channel shift list audio output mode is set, the apparatus controller 20 allows the audio signal generator circuit 19 to generate an audio signal regarding data in the channel shift list table 35 stored in the data memory 30, and outputs the generated audio signal via the loudspeakers 16A and 16B. Further, while a preset automatic change mode based on a channel shift list is set, the apparatus controller 20 automatically updates preset information in the channel preset information table 31 based on the data in the channel shift list table 35 stored in the data memory 30.

FIG. 2 is a diagram showing one example of a configuration of the channel preset information table 31 in the data memory 30 of FIG. 1. As apparent from FIG. 2, the channel preset information table 31 stores so-called "preset information" previously inputted, for example, with the keyboard 22. The channel preset information table 31 stores a display channel, which is a channel number to be displayed on a screen of the display 14 and a physical channel corresponding to a broadcast wave frequency for actually receiving a broadcast wave, for every key number (also referred to as a position number) for channel selection provided on the remote controller 40.

In the preferred embodiment of the present invention, a predetermined broadcast wave is received. Then, "channel change information" including a planned change date and time upon changing a current broadcast channel to a predetermined broadcast channel, information on broadcast channels before and after the change, and the like, and "channel change detail information", which is detailed information on the channel change information, are extracted from a data part in a data broadcast on a received predetermined broadcast wave. Then, the processing for detecting, confirming, and notifying the broadcast channel change according to the preferred embodiment of the present invention is executed. Concretely, in Japan, the "channel change information" and the "channel change detail information" can be acquired from, for example, an SDTT (Software Download Trigger Table) and detail information provided by "an engineering service" that is a detail information service for the SDTT. In this case, the SDTT is a table that transmits schedule information on differential data on software, and the SDTT is triggered by reception of "channel frequency change information" to shift to a processing for acquiring "frequency change detail information". The SDTT transmits minimum necessary information (e.g., a target area, start year, month and day for the change, a change work operation time interval, and the like), with which the SDTT can deal. Further, the engineering service transmits more detail information (e.g., the channel lists before and after the change, a change day, and the like). The detail information of the engineering service includes, for example, the following information and the like:

(1) Area identification: an area identification value indicating a service area.

(2) The number of network loops: the number of broadcasting stations that takes charge the aforementioned service area as a service area, and number includes the number of planned newly opened broadcasting stations as well as the number of currently operating broadcasting stations.

(3) Network identification: network identification for the aforementioned terrestrial digital television broadcasts.

(4) Transport stream identification: transport stream identification for the aforementioned terrestrial digital television broadcasts.

(5) Version number: a version of frequency information on the aforementioned network is indicated.

(6) Schedule number: a schedule number such as a frequency change and a newly opened station is described. When there is no change, zero is described as the schedule number.

(7) Start year, month, and day: start date and time for a change work operation is indicated.

(8) Duration: a time interval required for the change is described as the number of days.

(9) Number of changed detail information: the number of transmitter stations to be changed regarding operations during the above-mentioned time interval on the aforementioned network is described.

(10) Transmitter station identification: identification of the transmitter station to be changed is described, and a nation-wide unique value is allocated.

(11) Change year, month, and day: a specific operation day is described as a differential value from the start day. However, it is noted that a receiver needs to consider that an actual operation execution day is slightly different from the described execution day. The change day is not a test radio wave transmission day but a construction work completion day. After the change day, make it a fundamental rule to keep transmitting the radio wave stably.

(12) Change time: change time is described in units of hours. However, it is noted that the receiver needs to consider that an actual change time is slightly different from the described change time.

(13) Simultaneous operation time interval: when the broadcast wave is transmitted for a certain time interval even at a previous frequency in a simultaneous operation, the time interval is described by the number of days. As the simultaneous operation time interval, a simultaneous time interval after the change day is described.

(14) Physical channel number before change: a physical channel number before a change is described. Zero is described for a newly opened station.

(15) Physical channel number after change: a physical channel number after the change is described. When a broadcast program is finished due to management integration or the like, zero is described.

FIG. 3 is a diagram showing one example of a configuration of the channel change plan information table 32 stored in the data memory 30 of FIG. 1. The channel change plan information table 32 of FIG. 3 is an information table obtained by extracting change plan information in the aforementioned service area in the television receiver apparatus according to the preferred embodiment of the present invention. The channel change plan information table 32 stores a change date and time of one broadcast wave and physical channels before and after a change for every storage address. When the "change date and time" is elapsed at the extraction of the aforementioned information, "elapsed" is described.

The channel change information table 33 in the data memory 30 of FIG. 1 stores the "channel change information" extracted from a received predetermined broadcast wave. The channel change detail information table 34 stored in the data memory 30 of FIG. 1 stores the "channel change detail information" extracted from the received broadcast wave.

FIG. 4 is a diagram showing one example of a configuration of the channel shift list table 35 stored in the data memory 30 of FIG. 1. The channel shift list table 35 of FIG. 4 stores a list of channels to be shifted in the television receiver apparatus. Concretely, the channel shift list table 35 stores physical channels before and after the change for every storage address.

FIG. 5 is a diagram showing one example of a configuration of the recording reservation table 36 stored in the data memory 30 of FIG. 1. The recording reservation table 36 of FIG. 5 stores a list for recording reservations. Concretely, the recording reservation table 36 stores a start date and time for a recording reservation, an end date and time for the recording reservation, and a key number (which enables a corresponding physical channel to be specified by referring to the channel preset information table 31) for every reservation number.

FIGS. 6 to 8 are flowcharts showing a processing for detecting, confirming, and notifying a broadcast channel change, which is executed by the apparatus controller 20 of FIG. 1. The processing for detecting, confirming, and notifying a broadcast channel change consists of the following three partial processings.

(1) A "processing for detecting the broadcast channel change" from steps S1 to S12 of FIG. 6: This is a processing for creating the channel change plan information table 32 including the change date and time regarding the broadcast channel planned to be changed or already changed in the service area, and physical channels before and after the change, based on the "channel change information" and the "channel change detail information".

(2) A "processing for confirming the broadcast channel" from steps S21 to S28 of FIG. 7: This is a processing for confirming whether or not a broadcast wave on the changed broadcast channel is actually receivable based on the created channel change plan information table 32, and for creating the channel shift list table 35 as a confirmation result.

(3) A "processing for notifying the broadcast channel" from steps S31 to S37 of FIG. 8: This is a processing for notifying the user of a message of data in the created channel shift list table 35 by an image or speech synthesis, or for updating the channel preset information table 31 based on the data in the channel shift list table 35.

First of all, at step S1 of FIG. 6, the apparatus controller 20 controls the broadcast wave tuner circuit 10 to select a broadcast wave on which "channel change information" is broadcast. At step S2, the apparatus controller 20 receives the "channel change information", and stores the "channel change information" in the channel change information table 33. At step S3, it is judged whether or not a version of the received "channel change information" is newer than a version of the channel change information previously received and stored in the channel change information table 33. If YES at step S3, the control flow proceeds to step S4. On the other hand, if NO at step S3, the control flow proceeds to step S21 of FIG. 7. At step S4, the apparatus controller 20 controls the broadcast wave tuner circuit 10 to select a broadcast wave on which channel change detail information is broadcast. At step S5, the apparatus controller 20 receives the "channel change detail information" within a user's service area, and stores the received "channel change detail information" in the channel change detail information table 34. The control flow then proceeds to step S6.

At step S6, the apparatus controller 20 selects one unprocessed data from among the "channel change detail information" stored in the channel change detail information table 34. At step S7, it is judged whether or not a planned change date and time regarding the selected data is older than or equal to a current date and time. If YES at step S7, the control flow proceeds to step S8. On the other hand, if NO at step S7, the control flow proceeds to step S11. At step S8, it is judged whether or not a physical channel after a change is stored in the channel preset information table 31. If YES at step S8, the control flow proceeds to step S9. On the other hand, if NO at step S8, the control flow proceeds to step S10. At step S9, since the physical channel has been already changed in the channel preset information table 31, the apparatus controller 20 deletes the selected data from the channel change detail information table 34, and the control flow proceeds to step S12. At step S10, since the physical channel is not changed in the channel preset information table 31, the apparatus controller 20 stores the physical channels before and after the change regarding the selected data to be changed in the channel change plan information table 32, and stores "elapsed" as the change date and time therein, then the control flow proceeds to step S12. At step S11, since the physical channel is not changed in the channel preset information table 31, the apparatus controller 20 stores physical channels before and after the change regarding the selected data to be changed together with the change date and time in the channel change plan information table 32, and the control flow proceeds to step S12. At step S12, it is judged whether or not all of data among the "channel change detail information" stored in the channel change detail information table 34 have been processed. If YES at step S12, the control flow proceeds to step S21 of FIG. 7. On the other hand, if NO at step S12, the control flow returns to step S6 and the processing from steps S6 to S12 is repeatedly executed.

At step S21 of FIG. 7, the apparatus controller 20 deletes all of data in the channel shift list table 35. At step S22, the apparatus controller 20 selects one unprocessed data among "the channel change plan information" stored in the channel change plan information table 32. At step S23, it is judged whether or not the change date and time of the selected data is either "elapsed" or older than or equal to the current date and time. If YES at step S23, the control flow proceeds to step S24. On the other hand, if NO at step S23, the control flow proceeds to step S31 of FIG. 8. At step S24, the apparatus controller 20 receives the broadcast wave on the physical channel of the selected data. At step S25, it is judged whether or not the broadcast wave is receivable. If YES at step S25, the control flow proceeds to step S26. On the other hand, if NO at step S25, the control flow proceeds to step S27. At step S26, it is judged that the broadcast wave of the selected data is shifted to the physical channel after the change, the physical channels before and after the change are stored in the channel shift list table 35, and the control flow proceeds to step S28. At step S27, it is judged that the broadcast wave of the selected data is not shifted to the physical channel after the change, the selected date is not stored in the channel shift list table 35, and the control flow proceeds to step S28. At step S28, it is judged whether or not all of data among the channel change plan information stored in the channel change plan information table 32 have been processed. If YES at step S28, the control flow proceeds to step S31 of FIG. 8. On the other hand, if NO at step S28, the control flow returns to step S22 and the processing from steps S22 to S28 is repeatedly executed.

At step S31 of FIG. 8, it is judged whether or not data is stored in the channel shift list table 35. If YES at step S31, the control flow proceeds to step S32. On the other hand, if NO at step S31, the processing for detecting, confirming, and notifying the broadcast channel change is terminated. At step S32, it is judged whether or not a channel shift list image display mode is set. If YES at step S32, the control flow proceeds to step S33. On the other hand, if NO at step S32, the control flow proceeds to step S34. At step S33, the apparatus controller 20 allows the video signal generator circuit 18 to generate the video signal including an image of a message of the data stored in the channel shift list table 35, and displays the video signal on the display 14. Then, the processing for detecting, confirming, and notifying the broadcast channel change is terminated. At step S34, it is judged whether or not a channel shift list audio output mode is set. If YES at step S34, the control flow proceeds to step S35. On the other hand, if NO at step S34, the control flow proceeds to step S36. At step S35, the apparatus controller 20 allows the audio signal generator circuit 19 to generate an audio signal including a voice of a message of the data stored in the channel shift list table 35 by speech synthesis, and outputs the audio signal via the loudspeakers 16A and 16B. Then, the processing for detecting, confirming, and notifying the broadcast channel change is terminated. At step S36, it is judged whether or not a preset automatic change mode based on the channel shift list is set. If YES at step S36, the control flow proceeds to step S37. On the other hand, if NO at step S36, the processing for detecting, confirming, and notifying the broadcast channel change is terminated. At step S37, the channel preset information table 31 is updated based on the data in the channel shift list table 35, and the processing for detecting, confirming, and notifying the broadcast channel change is terminated.

Figure 9:
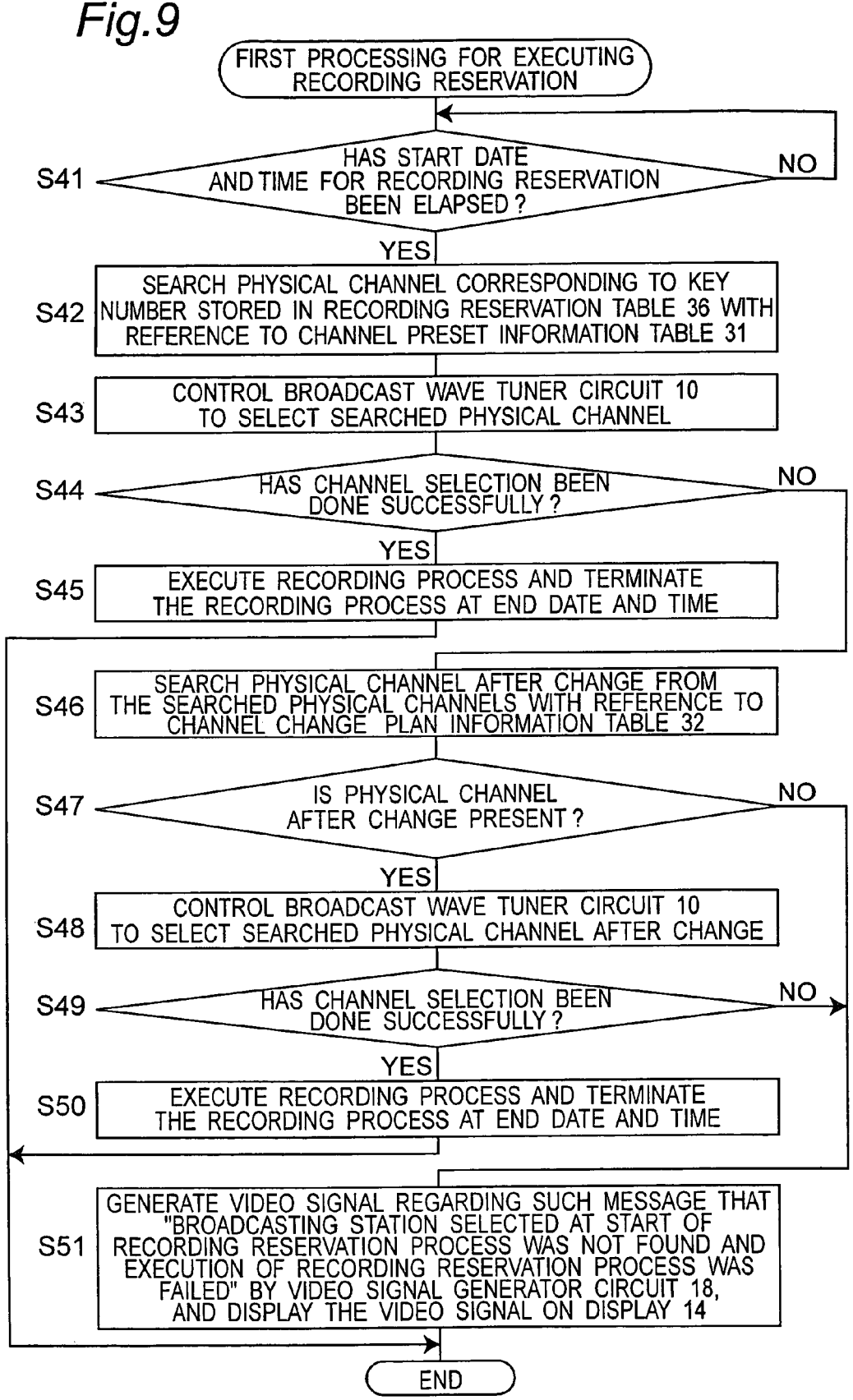
FIG. 9 is a flowchart showing a first processing for executing a recording reservation, which is executed by the apparatus controller 20 of FIG. 1.

FIG. 9 is a flowchart showing a first processing for executing a recording reservation, which is executed by the apparatus controller 20 of FIG. 1. The first processing for executing a recording reservation is a processing for executing a "processing for confirming a broadcast channel" when a recording is reserved and the recording is executed by the DVD recorder 17, in the case where at least the "processing for detecting the broadcast channel change" of FIG. 6 is terminated.

First of all, at step S41 of FIG. 9, the start date and time for the recording reservation table 36 is compared with the current date and time from the clock circuit 21. Then, it is judged whether or not the start date and time for the recording reservation has been elapsed. The processing at step S41 is repeatedly executed until a judgment result at step S41 becomes YES. If YES, the control flow proceeds to step S42. At step S42, a physical channel corresponding to a key number in the recording reservation table 36 is searched with reference to the channel preset information table 31. At step S43, the apparatus controller 20 controls the broadcast wave tuner circuit 10 to select the searched physical channel. At step S44, it is judged whether or not channel selection has been done successfully. If YES at step S44, the control flow proceeds to step S45. On the other hand, if NO at step S44, the control flow proceeds to step S46. At step S45, a recording process is executed and terminated at an end date and time. Then, the first processing for executing the recording reservation is terminated.

At step S46, the physical channel after the change is searched from the searched physical channels with reference to the channel change plan information table 32. At step S47, it is judged whether or not the physical channel after the change is present. If YES at step S47, the control flow proceeds to step S48. On the other hand, if NO at step S47, the control flow proceeds to step S51. At step S48, the apparatus controller 20 controls the broadcast wave tuner circuit 10 to select the searched physical channel after the change. At step S49, it is judged whether or not the channel selection has been done successfully. If YES at step S49, the control flow proceeds to step S50. On the other hand, if NO at step S49, the control flow proceeds to step S51. At step S50, the recording process is executed and terminated at the end date and time. Then, the first processing for executing the recording reservation is terminated. Further, at step S51, the apparatus controller 20 allows the video signal generator circuit 18 to generate a video signal regarding such a message that "broadcasting station selected at start of recording reservation process was not found, and execution of recording reservation process was failed" and displays the video signal on the display 14. Then, the first processing for executing the recording reservation is terminated.

As stated so far, in the first processing for executing the recording reservation of FIG. 9, when the selection of the physical channel described in the channel preset information table 31 is failed but the physical channel after the change is present in the channel change plan information table 32, the physical channel after the change is selected, and it is confirmed whether or not the broadcast wave is actually transmitted. Thereafter, when the channel selection is done successfully, the designated recording process is executed. When the channel selection is failed, such a message that the channel selection failed is displayed. Therefore, it is possible to eliminate the user's labor for confirming whether or not the broadcast wave is changed and whether or not the broadcast wave is actually transmitted with reference to the channel change plan information table 32. This leads to remarkable improvement in the operability.

FIG. 10 is a flowchart showing a second processing for executing a recording reservation, which is executed by the apparatus controller 20 of FIG. 1. The second processing for executing a recording reservation is a processing for executing the "processing for confirming a broadcast channel" when a recording is reserved and recording is executed by the DVD recorder 17, and when at least the "processing for confirming the broadcast channel" of FIG. 7 is terminated.

First of all, at step S61 of FIG. 10, the start date and time of the recording reservation table 36 is compared with the current date and time from the clock circuit 21. Then, it is judged whether or not the start date and time for the recording reservation has been elapsed. The processing at step S61 is repeatedly executed until a judgment result becomes YES. If YES, at step S62, a physical channel corresponding to a key number in the recording reservation table 36 is searched with reference to the channel preset information table 31. At step S63, the physical channel after the change is searched from the searched physical channel with reference to the channel shift list table 35. At step S64, it is judged whether or not the physical channel after the change is present. If YES at step 64, the control flow proceeds to step S65. On the other hand, if NO at step S64, the control flow proceeds to step S68. At step S65, the apparatus controller 20 controls the broadcast wave tuner circuit 10 to select the searched physical channel after the change. At step S66, it is judged whether or not the selection has been done successfully. If YES at step S66, the control flow proceeds to step S67. On the other hand, if NO at step S66, the control flow proceeds to step S68. At step S67, a recording process is executed and terminated at an end date and time. Then, the second processing for executing the recording reservation is terminated. At step S68, the apparatus controller 20 allows the video signal generator circuit 18 to generate a video signal regarding such a message that "broadcasting station selected at start of recording reservation process was not found, and execution of recording reservation process was failed" and displays the video signal on the display 14. Then, the second processing for executing the recording reservation is terminated.

As stated so far, in the second processing for executing the recording reservation of FIG. 10, when the physical channel after the change is present in the channel shift list table 35, the physical channel after the change is selected, and it is confirmed whether or not the broadcast wave is actually transmitted. Thereafter, when the channel selection is done successfully, the designated recording process is executed. When the channel selection is failed, such a message that the channel selection failed is displayed. Therefore, it is possible to eliminate the user's labor for confirming whether or not the broadcast wave is changed and whether or not the broadcast wave is actually transmitted with reference to the channel shift list table 35, respectively. This leads to remarkable improvement in the operability.

In the processing for detecting the broadcast channel change of FIG. 6, the channel change plan information table 32 is created based on the received "channel change information" and "channel preset information". However, the present invention is not limited to this. The channel change plan information table 32 may be created, for example, based on the received "channel change information" without executing the processing at step S8.

At steps S33 and S35 of FIG. 8, the message of the data in the channel shift list table 35 is displayed or outputted by speech output. However, the present invention is not limited to this. The message may be notified by the other notification method. In addition, both the notification processing for displaying the message of the data in the channel shift list table 35, or for outputting the message by the audio output, and the processing for updating the channel preset information table 31 at step S37 may be executed.

In the processing for notifying the broadcast channel of FIG. 8, the display of the data, the audio output, and the update of the channel preset information table 31 are executed based on the channel shift list table 35. However, the present invention is not limited to this. The display of the data, the audio output, and the update of the channel preset information table 31 may be executed based on the channel change plan information table 32.

In the preferred embodiments stated so far, the television receiver apparatus includes the DVD recorder 17. Alternatively, the television receiver apparatus may include a recording apparatus, such as a videotape recorder or the like, in place of the DVD recorder 17.

In the preferred embodiments stated so far, the television receiver apparatus that includes functions of detecting, confirming, and notifying the channel change includes the DVD recorder 17. Alternatively, a recording apparatus, such as the DVD recorder 17 or the like, including functions of detecting, confirming, and notifying the channel change may be constituted.

As stated so far, according to the preferred embodiment of the present invention, the television receiver apparatus can search and automatically detect the channel change plan information including the change date and time regarding the physical channel to be changed by the television receiver apparatus and the physical channels before and after the change. Therefore, it is possible to detect that the broadcast channel is changed without any user's execution of the "channel search" or the like, and to prevent a non-receivable state resulting from an error between the change date and time of the channel planned by the broadcasting station and an actual change date and time from being reflected in the "preset information".

Furthermore, when the change date and time in the channel change plan information is older than or equal to the current date and time, the broadcast wave on the physical channel after the change in the channel change plan information is received. Then, it is judged whether or not the broadcast wave is actually receivable. In addition, the physical channels before and after the change regarding the broadcast wave that is actually receivable are stored in the second storage device as the channel shift list. Therefore, it is possible to confirm whether or not the broadcast wave on the broadcast channel is actually receivable when the broadcast channel change is detected.

Moreover, when the broadcast channel change is detected or when the reception of the broadcast wave on the broadcast channel is confirmed, it is possible to notify a user of such a message that the broadcast channel change is detected or reception of the broadcast wave on the broadcast channel is confirmed, or to update the "preset information" appropriately.

In addition, the user can instantly recognize the channel change without executing the channel search. Further, according to the apparatus of the preferred embodiment of the present invention, when the broadcasting station transmits in advance the planned date and time information for changing the channel and the channel information, the broadcasting station can issue such a notification that can follow up an actual channel change by receiving the change information in advance and receiving the channel at the date and time even if the error of the date and time generates depending on the broadcasting station.

Additionally, when the broadcast channel is changed, the apparatus according to the preferred embodiment of the present invention notifies the user of the change. Then, the user can be notified of the timing for updating position information, and can change the channel of the position. Therefore, it is possible to prevent the broadcast wave from being received based on the older channel information.

Furthermore, various modified preferred embodiments of the present invention will be described below.

First Modified Preferred Embodiment

In a first modified preferred embodiment, a processing executed at a timing corresponding to a execution timing of the first processing for executing the recording reservation, and executed when a recording is reserved or the recording reservation is executed.

(1) The change plan information is previously known even before a change from the data in the channel change plan information table 32. Therefore, an alarm message may be notified to the user at setting of an execution by displaying or speech outputting so that the user may be notified that there is a probability of failure of reservation to be set, at the execution of the reservation since there is a probability of frequency change. Alternatively, the entire data in the channel change plan information 32 may be notified to the user.

(2) The change plan information is previously known even before the change from the data in the channel change plan information table 32. Therefore, an alarm message is notified the user of by displaying or speech outputting. Thereafter, an operation screen on which the user can input Yes or No is displayed, such a message that "there is such a probability that the frequency is changed when this recording reservation is executed. At the execution of the recording reservation, select a channel on a channel planned to be changed?" is displayed, and a user's intention is displayed on the Yes or No operation screen. When the user's answer is Yes, the recording reservation that is set at this time is executed on the channel after the change. On the other hand, when the user's answer is No, the recording reservation is executed on the channel that is set at the recording reservation setting.

Second Modified Preferred Embodiment

In a second modified preferred embodiment, a processing executed at a timing corresponding to an execution timing when the second processing for executing the recording reservation, and executed when a recording is reserved or the recording reservation is executed.

(1) The change plan information is previously known even before the change from the data in the channel shift list table 35. Therefore, an alarm message for the information may be notified to the user by displaying or speech outputting at setting of a reservation so that the user may be notified that there is a probability of failure of reservation to be set at the execution of the reservation since there is a probability of frequency change. Alternatively, the entire data stored in the channel shift list table 35 may be notified to the user.

(2) The change plan information is previously known even before the change from the data in the channel shift list table 35. Therefore, an alarm message for the information is notified to the user by displaying or speech outputting. Thereafter, an operation screen on which the user can input Yes or No is displayed, such a message that "there is such a probability that frequency is changed when this recording reservation is executed. At the execution of the recording reservation, select channel on a channel planned to be changed?" is displayed, and a user's intention is displayed on the Yes or No operation screen. When a user's answer is Yes, the recording reservation that is set at this time is executed on the channel after the change. On the other hand, when the user's answer is No, the recording reservation is executed on the channel that is set during the recording reservation setting.

Third Modified Preferred Embodiment

In a channel selection operation when a user normally uses a television receiver apparatus, the following processings may be executed.

(1) When the user sets a channel or normally select a channel but can not select the channel at a frequency before a change, a control is executed so as to automatically reselect a channel using a physical channel after the change, based on the channel change plan information table 32 or the channel shift list table 35. Advantageous effects for this are as follows. A broadcast wave on a broadcast channel may possibly be stopped in the nighttime. When a channel search timing after acquisition of the channel change information, such as the SDTT or the like, coincides with the time zone, it is expected that the broadcast wave can not be correctly received even if the channel is changed, and that it is impossible to judge whether or not the channel is changed. However, by using the method, it is possible to increase the number of timings when which the user can appropriately deal with such a situation.

(2) When the user sets a channel or normally selects a channel but cannot select the channel on a channel before a change, an Yes or No operation screen may be displayed. When the user inputs Yes, a control may be executed so as to automatically reselect a channel based on information data in the channel change plan information table 32 or the channel shift list tale 35. In addition, the data in the channel preset information table 31 may be updated. This leads to that, it is possible to increase opportunities on which the broadcast wave can be correctly received when the user sets a channel or normally selects a channel, and it is possible to update the date in the channel preset information table 31 into a latest state.

INDUSTRIAL APPLICABILITY

As stated so far in detail, the broadcast channel change detection apparatus according to the present invention can search and automatically detect the channel change plan information including the change date and time regarding the physical channel to be changed by the television receiver apparatus, and the physical channels before and after the change. Therefore, it is possible to detect that the broadcast channel is changed without any user's execution of the "channel search" or the like, and to prevent a non-receivable state resulting from an error between the change date and time of the channel planned by the broadcasting station and an actual change date and time from being reflected in the "preset information".

Furthermore, when the change date and time in the channel change plan information is older than or equal to the current date and time, the broadcast channel change detection apparatus receives the broadcast wave on the physical channel after the change in the channel change plan information, judges whether or not the broadcast wave is actually receivable based on the detected channel change plan information, and stores the physical channels before and after the change regarding the broadcast wave that is actually receivable in the second storage device as the channel shift list. Therefore, it is possible to confirm whether or not the broadcast wave on the broadcast channel is actually receivable when the broadcast channel change is detected.

Moreover, when the broadcast channel change is detected or the reception of the broadcast wave on the broadcast channel is confirmed, it is possible to notify the user of such a message that the broadcast channel change is detected or reception of the broadcast wave on the broadcast channel is confirmed, or to update the "preset information" appropriately.

The invention claimed is:

1. A broadcast channel change detection apparatus comprising:
    a detection device for receiving a broadcast wave including channel change information that includes a change date and time of a physical channel of the broadcast wave and physical channels before and after the change, and for searching and detecting channel change plan information that includes the change date and time regarding the physical channel to be changed in a television receiver apparatus and the physical channels before and after the change, based on the channel change information; and
    a judgment device for receiving the broadcast wave on the physical channel after the change in the channel change plan information, and for judging whether or not the broadcast wave is actually receivable based on the detected channel change plan information, when the change date and time in the channel change plan information is older than or equal to a current date and time.

2. The broadcast channel change detection apparatus as claimed in claim 1,
    wherein said judgment device stores the physical channels before and after the change regarding the broadcast wave that is actually receivable, in a second storage device as a channel shift list.

3. The broadcast channel change detection apparatus as claimed in claim 2, further comprising a notification device for notifying a user of information of the stored channel shift list.

4. The broadcast channel change detection apparatus as claimed in claim 2, further comprising an update device for updating the channel preset information including the physical channel of the broadcast wave received by the television receiver apparatus, based on the information of the stored channel shift list.

5. A recording apparatus comprising:
    a recording device for receiving a broadcast wave, and recording video and audio signals of the received broadcast wave;
    a detection device for receiving the broadcast wave including channel change information that includes a change date and time of a physical channel of the broadcast wave and physical channels before and after the change, and for searching and detecting channel change plan information that includes the change date and time regarding the physical channel to be changed in a television receiver apparatus and the physical channels before and after the change, based on the channel change information; and a controller for judging whether or not a physical channel after the change is present based on the channel change plan information upon executing a reserved recording process, for receiving the broadcast wave on the physical channel after the change in the channel change plan information and judging whether or not the broadcast wave is actually receivable when the physical channel after the change is present, and for executing the recording process when the broadcast wave is actually receivable.

6. The recording apparatus as claimed in claim 5, wherein said controller notifies a user that the recording process failed when the broadcast wave is actually non-receivable.

7. A recording apparatus comprising:

a recording device for receiving a broadcast wave, and recording video and audio signals of the received broadcast wave;

a detection device for receiving the broadcast wave including channel change information that includes a change date and time of a physical channel of the broadcast wave and physical channels before and after the change, and for searching and detecting channel change plan information that includes the change date and time regarding the physical channel to be changed in a television receiver apparatus and the physical channels before and after the change, based on the channel change information; and a controller for judging whether or not a physical channel after the change is present based on the channel shift list upon executing a reserved recording process, for receiving the broadcast wave on the physical channel after the change in the channel shift list and judging whether or not the broadcast wave is actually receivable when the physical channel after the change is present, and for executing the recording process when the broadcast wave is actually receivable.

8. The recording apparatus as claimed in claim 7, wherein said controller notifies a user that the recording process failed when the broadcast wave is actually non-receivable.

* * * * *